Aug. 16, 1932.   H. C. SCHLOSSER ET AL   1,872,352
PROCESS OF FORMING MARKED SURFACING
Filed July 18, 1927
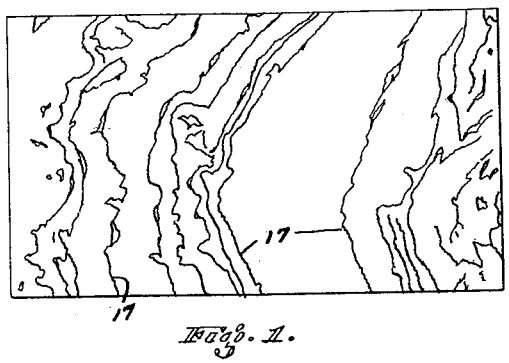
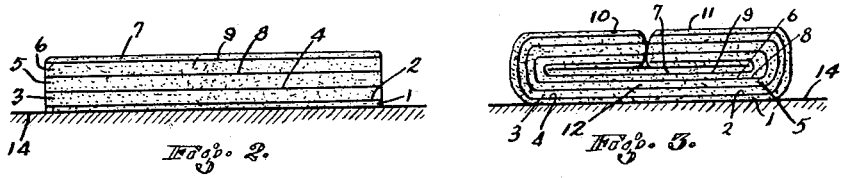
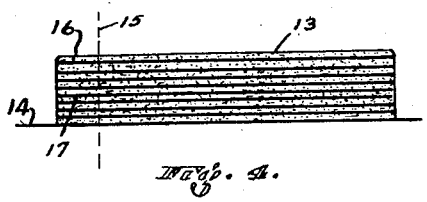 
INVENTOR
HARRY CHANDLER SCHLOSSER
WILLIAM HENRY SCHLOSSER.
BY
ATTORNEYS.

Patented Aug. 16, 1932

1,872,352

UNITED STATES PATENT OFFICE

HARRY CHANDLER SCHLOSSER AND WILLIAM HENRY SCHLOSSER, OF SAN JOSE, CALIFORNIA

PROCESS OF FORMING MARKED SURFACING

Application filed July 18, 1927. Serial No. 206,675.

Our invention relates to improvements in process of forming marked surfacing, and it consists in the steps hereinafter set forth.

An object of our invention is to provide a process in which markings of various shades can be given to the composition, these markings extending entirely through the thickness of the material.

A further object of our invention is to provide a process of the character described, in which the markings are provided in the material before the latter is placed upon the wall or floor to be surfaced, these markings being changed at the will of the operator after the material has been placed upon the floor, and while still in a plastic state.

Other objects and advantages will appear in the following specification, and the novel features of our invention will be particularly pointed out in the appended claims.

Our invention is illustrated diagrammatically in the accompanying drawing, forming a part of this application, in which Figure 1 is a top plan view of a portion of the complete composition;

Figure 2 is a side elevation of the composition during one of the initial stages of the forming thereof;

Figure 3 illustrates another step in the process;

Figure 4 and Figure 5 illustrate still other steps.

In carrying out our invention we make use of powdered magnesite and magnesium chloride solution. We mix these together in the proportions of 100 pounds of magnesite to 125 pints of the solution, the solution preferably being at 23 Bé.; these two ingredients are stirred together until they are thoroughly mixed and when they are mixed they will form a thin batter, which may be worked upon with a trowel.

As a filler we add 200 pounds of powdered calcium carbonate, or any other suitable filler and we also add 10 pounds of magnesium carbonate, or any other suitable filler having a better texture than the calcium carbonate and therefore having better working possibilities. These two are stirred into the first mass until they are thoroughly mixed therein. The result is a mortar having a rather stiff consistency. We have also found that wood can be used as a filler, if a certain characteristic quality to the composition is desired. Other fillers which may be used are silica, talc, feldspar, et cetera.

Before the calcium carbonate and magnesium carbonate are added to the magnesite, and the magnesium chloride, a number of small quantities of the mixture of magnesite and the magnesium chloride are set apart and they are treated with various colors for providing the color lines in the complete mass which will be hereinafter described. One of the small quantities of the first mixture may be treated with iron oxide for forming a mass having a red color. Another quantity may be treated with ultramarine, which will give a blue color to the mass so treated; a third may be treated in chromium oxide, which gives a green color; and a fourth may be treated with carbon, which will give a black color. It is obvious that other colors may be mixed with other quantities of the mass formed from the magnesite, and the magnesium chloride. We have set forth these few to show how the process is carried out in one of its forms.

The main mortar mixture consisting of the four ingredients set forth in the first part of the specification may be tinted with a color, if desired, so as to give a uniform color back-ground to the entire composition, or it may be left white, at the will of the operator. This mortar is divided into a number of equal parts, the number depending upon the number of layers which the operator desires to use. Assume that five parts are formed. One of these parts is spread out on a smooth surface to make a layer, after the manner of a cake. This layer is then "buttered" with a thin layer of one of the color mixtures, for example: the one treated with iron oxide. Reference to Figure 2 shows that the layer just mentioned is designated by the numeral 1, while the layer of "butter" containing the iron oxide is designated by the reference numeral 2. A second quantity of the mortar is now placed upon the iron oxide, or red layer and is indicated by the reference numeral 3.

The top of this layer may now be "buttered" with the mass treated with the ultramarine, as shown by reference numeral 4. In this manner additional layers 5, 6, and 7 are added one upon the other, and are separated by color layers 8, and 9, which are extremely thin relative to the thickness of layers 1, 3, 5, 6, and 7.

The mass is plastic and may be leveled down so as to spread over a greater area and of course be of less thickness than when the layers were first piled one upon the other. It should be noted, however, that the color layer will not disappear through this step, but will be merely thinned out so as to provide substantially a pencil line between adjacent layers.

The operator now doubles the number of color lines in the mass, by taking the ends of the mass and folding them back upon themselves in the manner shown in Figure 3. The end portions 10 and 11 will meet each other and will overlie the mid-portion 12. The first step is again repeated until the entire mass spreads out and is of substantially the same thickness as was formerly the case, before the first folding of the mass took place. It will be noted, however, that in this instance the number of color lines is exactly double to the number shown in Figure 2.

The mass is again folded upon itself for again doubling the color lines. These thinning and doubling over portions of the mass upon other portions may be continued three or four times, if desired, or more, until the desired number of color lines are formed in the composition. These color lines will remain horizontal and will remain distinctly separate from each other, although the space separating adjacent color lines may be extremely small. The complete composition is shown in Figure 4 and this composition will contain the desired number of color lines and will also be of the desired thickness.

In applying the composition 13 to the floor 14 a trowel, not shown, is used and cuts through the composition along the line 15, see Figure 4. The portion 16 is removed from the mass 13 and it will be noted that the color lines 17 extend vertically with respect to the line 15, and therefore with respect to the trowel. The piece 16 is placed upon the surface 14 so as to cause the color lines 17 to extend entirely through the thickness of the composition. A number of similar pieces 16 are severed from the mass 13 and are placed side by side upon the floor 14 for forming a continuous surface, which has a number of vertically extending color lines therein. We have described the mass as being sliced in a perpendicular line, as indicated by the numeral 15, but it is obvious that the slicing may be oblique, or in a horizontal manner, according to the will of the operator. After the desired area has been covered and somewhat smoothed, the mass is allowed to set until it becomes somewhat stiff. A scraper is now used and removes the top, or the blurred portions, and shows up the pattern of the composition. Certain depressions in the top are evened up by adding material so as to provide a smooth surface, and the entire mass is again allowed to set so that the new matter added can become a part of the flooring. The surface of the mass is again scraped, and if the smoothness and the pattern has not yet been obtained, a trowel may be employed for scraping the surface, until the operator is satisfied with the results. The manner of applying the mass of slices determines the shape the various color lines will take in the complete work. Figure 1 indicates the color lines 17 as extending in various directions and causes the composition to closely simulate a piece of marble. In general, perpendicular slicings which have been laid on with a movement in the direction of the color line, will appear as veins, while horizontal slicings will show as blotches, and oblique slicings will show the combination of veins and blotches. In this way, innumerable designs can be formed and these designs can be of any color desired.

Although we have shown and described one embodiment of our invention, it is to be understood that the same is susceptible of various changes and we reserve the right to employ such changes as may come within the scope of the appended claims.

We claim:

1. The method of making a surface imitating that of veined natural stone which consists of laying out a layer of self-hardening material designed to give the appearance of the body of the surface, applying a thin layer of self-hardening material over the entire top surface of said layer designed to produce the veining, applying additional layers of body material and veining material alternately in such a manner that each layer covers the entire top surface of the subjacent layer, folding the ends of the stacked layers together over the center of the top of the mass, flattening out the mass and repeating the folding and flattening operations until the layers have been made quite thin to produce the desired veining, slicing the mass transversely of the layers, applying the slices to the article to be surfaced and allowing the slices to harden.

2. The method of making a variegated marbleized surface having colored veins which comprises making a mortar of relative stiffness, said mortar being made of magnesite, magnesium chloride and a filler, spreading a relatively thin layer of a color composition on said layer of mortar, stacking successively and alternately layers of mortar and colored composition on top of one another, folding the stack together over the center of the top of the stack, flattening out the stack, repeating the folding and flattening operations until the colored layers have been made extremely thin to produce the desired veining, slicing the mass transversely of the layers, applying the slices on a foundation to form a surface, the veins of the slices running transversely to the plane of the surface, and allowing the surface to harden.

HARRY CHANDLER SCHLOSSER.
WILLIAM HENRY SCHLOSSER.